United States Patent
Nagai et al.

(10) Patent No.: US 10,654,991 B2
(45) Date of Patent: May 19, 2020

(54) GRANULAR MATERIAL, GRANULAR MATERIAL MANUFACTURING METHOD, THREE-DIMENSIONAL LAMINATED AND SHAPED MOLD MANUFACTURING APPARATUS, AND THREE-DIMENSIONAL LAMINATED AND SHAPED MOLD MANUFACTURING METHOD

(71) Applicant: TECHNOLOGY RESEARCH ASSOCIATION FOR FUTURE ADDITIVE MANUFACTURING, Tokyo (JP)

(72) Inventors: Yasuhiro Nagai, Gunma (JP); Kosuke Takeshita, Gunma (JP); Toshimitsu Okane, Ibaraki (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 461 days.

(21) Appl. No.: 15/124,335

(22) PCT Filed: Apr. 20, 2016

(86) PCT No.: PCT/JP2016/062506
§ 371 (c)(1),
(2) Date: Sep. 7, 2016

(87) PCT Pub. No.: WO2017/183134
PCT Pub. Date: Oct. 26, 2017

(65) Prior Publication Data
US 2018/0112067 A1    Apr. 26, 2018

(51) Int. Cl.
*B29C 69/00* (2006.01)
*C08K 9/04* (2006.01)
(Continued)

(52) U.S. Cl.
CPC .............. *C08K 9/04* (2013.01); *B22C 1/10* (2013.01); *B22C 1/224* (2013.01); *B22C 1/2253* (2013.01);
(Continued)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS

| | | |
|---|---|---|
| 3,227,567 A | 1/1966 | Dess |
| 2011/0073269 A1 | 3/2011 | Frohn et al. |

(Continued)

FOREIGN PATENT DOCUMENTS

| | | |
|---|---|---|
| CN | 102076440 A | 5/2011 |
| CN | 104066532 A | 9/2014 |

(Continued)

OTHER PUBLICATIONS

J-PlatPat English abstract of JP 2013-240799 A which corresponds to JP 5249447 B1.

(Continued)

*Primary Examiner* — Ryan M Ochylski
(74) *Attorney, Agent, or Firm* — Ladas & Parry LLP

(57) ABSTRACT

The present invention is a granular material that can be well recoated regardless of the type of the granular material, and enables a refractory aggregate in an unprinted portion to be used without any regeneration process, in the manufacture of a three-dimensional laminated and shaped mold. This granular material is a granular material for use in three-dimensional laminated mold shaping, and obtained by adding a material that causes a hydration reaction having a moisture absorbing function and generates a catalytic effect to a coating material mixed with or coated with an acid as (Continued)

a catalyst which activates and hardens an organic binder for binding the granular material.

15 Claims, 1 Drawing Sheet

(51) Int. Cl.
| | |
|---|---|
| B22C 9/12 | (2006.01) |
| B22C 1/22 | (2006.01) |
| B29C 64/165 | (2017.01) |
| C04B 35/653 | (2006.01) |
| C04B 35/14 | (2006.01) |
| C04B 35/628 | (2006.01) |
| C04B 35/634 | (2006.01) |
| C04B 28/00 | (2006.01) |
| C04B 35/626 | (2006.01) |
| C04B 35/632 | (2006.01) |
| B28B 1/00 | (2006.01) |
| B32B 18/00 | (2006.01) |
| C04B 26/12 | (2006.01) |
| C04B 20/10 | (2006.01) |
| C04B 26/10 | (2006.01) |
| B22C 1/10 | (2006.01) |
| B22C 9/02 | (2006.01) |
| C08K 3/36 | (2006.01) |
| C08K 9/02 | (2006.01) |
| B33Y 80/00 | (2015.01) |
| C04B 111/00 | (2006.01) |
| C04B 103/00 | (2006.01) |
| B33Y 10/00 | (2015.01) |
| B33Y 70/00 | (2020.01) |

(52) U.S. Cl.
CPC ............. *B22C 9/02* (2013.01); *B22C 9/12* (2013.01); *B28B 1/001* (2013.01); *B29C 64/165* (2017.08); *B32B 18/00* (2013.01); *C04B 20/107* (2013.01); *C04B 26/105* (2013.01); *C04B 26/12* (2013.01); *C04B 28/00* (2013.01); *C04B 35/14* (2013.01); *C04B 35/6266* (2013.01); *C04B 35/62802* (2013.01); *C04B 35/62886* (2013.01); *C04B 35/632* (2013.01); *C04B 35/63448* (2013.01); *C04B 35/63472* (2013.01); *C04B 35/63476* (2013.01); *C04B 35/63484* (2013.01); *C04B 35/653* (2013.01); *C08K 3/36* (2013.01); *C08K 9/02* (2013.01); *B33Y 10/00* (2014.12); *B33Y 70/00* (2014.12); *B33Y 80/00* (2014.12); *C04B 2103/0012* (2013.01); *C04B 2111/00431* (2013.01); *C04B 2111/00612* (2013.01); *C04B 2235/448* (2013.01); *C04B 2235/449* (2013.01); *C04B 2235/5427* (2013.01); *C04B 2235/5436* (2013.01); *C04B 2235/6025* (2013.01); *C04B 2235/6026* (2013.01); *C08K 2201/005* (2013.01); *Y02P 10/292* (2015.11)

(56) References Cited

U.S. PATENT DOCUMENTS

| | | | |
|---|---|---|---|
| 2014/0224152 | A1 | 8/2014 | Fukuda et al. |
| 2016/0158828 | A1 | 6/2016 | Tanaka |

FOREIGN PATENT DOCUMENTS

| | | |
|---|---|---|
| CN | 104801664 A | 7/2015 |
| CN | 105492138 A | 4/2016 |
| JP | 53-119724 A | 10/1978 |
| JP | 9-141386 A | 6/1997 |
| JP | 2004-298920 A | 10/2004 |
| JP | 2011-140034 A | 7/2011 |
| JP | 2011-520615 A | 7/2011 |
| JP | 5249447 B1 | 4/2013 |
| JP | 2013-240799 A | 12/2013 |
| WO | 2009/141158 A1 | 11/2009 |

OTHER PUBLICATIONS

J-PlatPat English abstract of JP 2011-140034 A.
J-PlatPat English abstract of JP 9-141386 A.
Chinese Office Action dated Sep. 3, 2018 in connection with Chinese Patent Application No. CN 201680018906.3, with English translation.
Espacenet English abstract of CN 105492138 A.
Espacenet English abstract of CN 104066532 A.
Espacenet English abstract of CN 102076640 A.
Supplementary European Search Report (SESR) dated Jul. 27, 2018 mailed in connection with corresponding European Patent Application No. 16 825 691.5.
Patent Abstracts of Japan English abstract of JP 2004-298920 A.
Chinese Office Action with an English translation dated Oct. 23, 2019 for Chinese Patent Application No. 201680018906.3.
espacenet English abstract of CN 104801664 A.

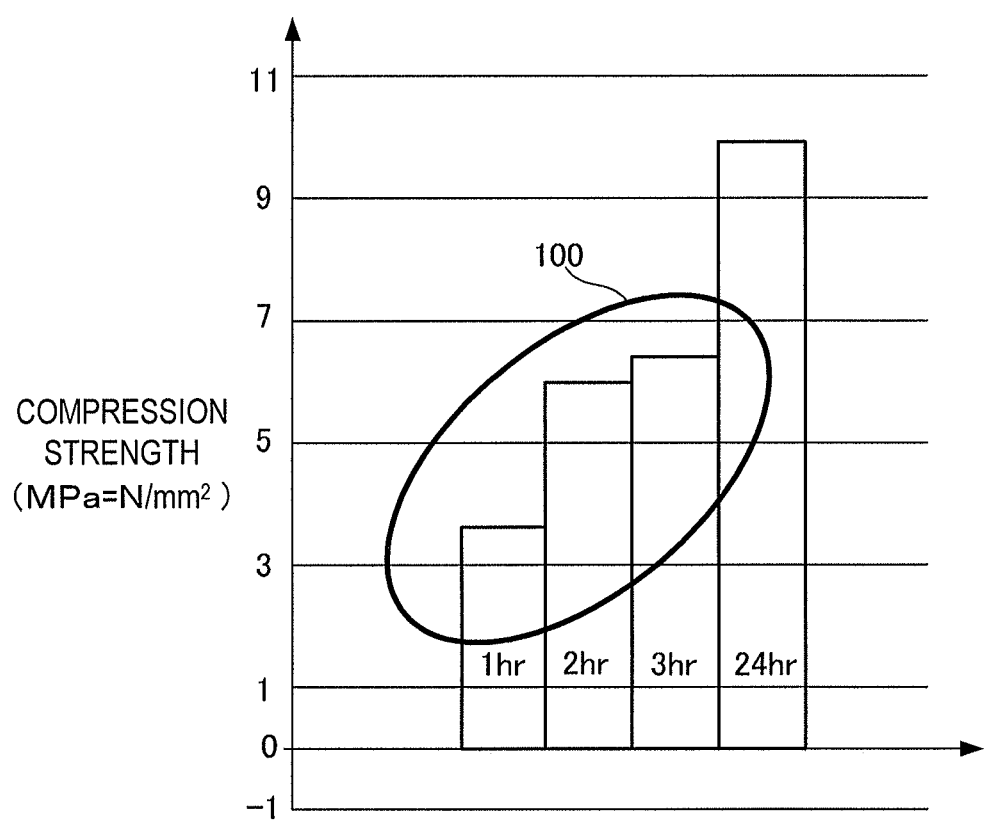

GRANULAR MATERIAL, GRANULAR MATERIAL MANUFACTURING METHOD, THREE-DIMENSIONAL LAMINATED AND SHAPED MOLD MANUFACTURING APPARATUS, AND THREE-DIMENSIONAL LAMINATED AND SHAPED MOLD MANUFACTURING METHOD

RELATED APPLICATION

This application is an application under 35 U.S.C. 371 of International Application No. PCT/JP2016/062506 filed on Apr. 20, 2016, the entire contents of which are incorporated herein by reference.

TECHNICAL FIELD

The present invention relates to a three-dimensional laminated and shaped mold manufacturing technique.

BACKGROUND ART

A mold is necessary to manufacture a cast metal. Examples of the mold are a heat-hardening mold, self-hardening mold, and gas-hardening mold. For example, the self-hardening mold is generally manufactured by a method of filling kneaded sand containing a refractory granular material, hardener, and binder in a wooden model or resin model (to be collectively called "a model" hereinafter), and hardening the binder. To manufacture a mold having a complicated shape, however, it is naturally necessary to increase the number of models, and this complicates the process. Also, even when the number of models can be increased, no mold can be manufactured if the models cannot be removed from the mold.

To solve these problems, a mold manufacturing technique using three-dimensional laminating and shaping capable of directly manufacturing a mold without using any model has been proposed. Three-dimensional laminating and shaping is a method of manufacturing a mold by directly using a three-dimensional shape input on a CAD (Computer Aided Design) system as a stereomodel (three-dimensional model).

A known example of this mold manufacturing technique using three-dimensional laminating and shaping is a method (two-component self-hardening mold) of repeating an operation of laminating (recoating) kneaded sand obtained by mixing a refractory granular material and liquid hardener and printing a binder on the kneaded sand based on CAD data, and removing the kneaded sand from an unprinted portion after the binder is hardened (see, e.g., patent literature 1).

CITATION LIST

Patent Literature

Patent literature 1: Japanese Patent No. 5249447

SUMMARY OF THE INVENTION

Technical Problem

Unfortunately, when manufacturing a mold by three-dimensional laminating and shaping of a two-component self-hardening mold, a liquid hardener is contained in kneaded sand in an unprinted portion, so the mold cannot be used for a recoater in a dried state because the fluidity of the kneaded sand is low. Also, the kneaded sand is green. To reuse the kneaded sand, therefore, the kneaded sand is regenerated by calcination and then used as reusable sand, so the process is time-consuming.

The present invention enables to provide a technique of solving the above-described problem.

Solution to Problem

One aspect of the present invention provides a granular material for use in three-dimensional laminated mold shaping, wherein a coating material mixed with or coated with an acid as a catalyst which activates and hardens an organic binder for binding the granular material contains a material that causes a hydration reaction having a moisture absorbing function and generates a catalytic effect.

Another aspect of the present invention provides a method for manufacturing a granular material for use in three-dimensional laminated mold shaping, comprising:

forming a coating material by coating a surface of a refractory granular raw material having an average grain size of 50 to 300 µm, with an acid as a catalyst that activates and hardens an organic binder for binding the granular material; and forming the granular material for use in laminated mold shaping by mixing magnesium sulfate in the coating material.

Still other aspect of the present invention provides a method for manufacturing a granular material for use in three-dimensional laminated mold shaping, comprising:

forming a first material mixture by mixing a refractory granular raw material having an average grain size of 50 to 300 µm and an acid solution prepared by dissolving, in a solvent, an acid as a catalyst that activates and hardens an organic binder for binding the granular material;

forming a second material mixture by adding and mixing magnesium sulfate in the first material mixture; and stirring the second material mixture, and immobilizing water molecules by a hydration reaction between the magnesium sulfate and the solvent of the acid solution, thereby forming a granular material for use in laminated mold shaping.

Still other aspect of the present invention provides a three-dimensional laminated and shaped mold manufacturing apparatus uses:

a granular material in which a material that causes a hydration reaction having a moisture absorbing function and generates a catalytic effect is contained in an acid-coated coating material, as a shaping material to be spread into layers and selectively bound; and an organic binder, as a binder for selectively binding the granular material.

Still other aspect of the present invention provides a method of manufacturing a three-dimensional laminated and shaped mold, comprising:

spreading a granular material into layers;

selectively ejecting an organic binder to the spread granular material and hardening the organic binder so as to bind the spread granular material in accordance with a target three-dimensional laminated and shaped mold; and repeating said spreading step and said hardening step until the target three-dimensional laminated and shaped mold is shaped, wherein a coating material mixed with or coated with an acid as a catalyst that activates and hardens the organic binder for binding the granular material contains a material that causes a hydration reaction having a moisture absorbing function and generates a catalytic effect.

Advantageous Effects of Invention

According to the present invention, in the manufacture of a three-dimensional laminated and shaped mold, it is possible to well perform recoating regardless of the type of granular material, and use a refractory aggregate in an unprinted portion without any regeneration process.

BRIEF DESCRIPTION OF DRAWINGS

FIG. 1 is a view showing the mold strength appearance rate of a granular material coated with an acid and mixed with magnesium sulfate according to an embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<<Three-Dimensional Laminated and Shaped Mold Manufacturing Method>>

The three-dimensional laminated and shaped mold manufacturing apparatus mainly includes a blade mechanism, printing nozzle head mechanism, and shaping table mechanism. The apparatus further includes a controller for controlling the operation of each structure by using three-dimensional data of a shaping target.

The blade mechanism includes a recoater, and laminates, on a shaping portion bound by an organic binder, a granular material (to be also referred to as coating sand hereinafter) containing an acid and magnesium sulfate and having a predetermined thickness as the material of a three-dimensional laminated and shaped mold. The printing nozzle head mechanism performs printing on the laminated granular material by using the organic binder, thereby shaping one layer by binding the granular material. The shaping table mechanism moves down by one layer when shaping of one layer is complete, thereby implementing laminating and shaping by a predetermined thickness.

<<Manufacturing Materials of Three-Dimensional Laminated and Shaped Mold>>

As manufacturing materials for use in the three-dimensional laminated and shaped mold manufacturing apparatus of this embodiment, the granular material and binder will be explained in detail below.

(Granular Material)

Examples of the granular material of this embodiment are natural sand such as silica sand, olivine sand, zircon sand, chromite sand, alumina sand, and mullite sand, and artificial sand, each of which is a granular material having a fire resistance (to be also referred to as a refractory granular material hereinafter). It is also possible to use collected used natural sand or artificial sand, or regenerated used natural sand or artificial sand.

Artificial sand is generally obtained by a sintering method, fusion method, or flame-fusion method by using bauxite as a raw material. Note that the practical conditions and the like of the sintering method, fusion method, or flame-fusion method are not particularly limited, so artificial sand need only be manufactured by using the well-known conditions and the like described in, e.g., Japanese Patent Laid-Open Nos. 5-169184, 2003-251434, and 2004-202577.

The average grain size of the refractory granular material is preferably 50 to 300 μm, and more preferably, 75 to 150 μm. When the average grain size is 300 μm or less, a three-dimensional laminated and shaped mold having a high surface phase degree is obtained. The surface phase degree indicates the surface roughness of the three-dimensional laminated and shaped mold in the laminating direction.

As the refractory granular material, artificial sand hardly expands due to fire or heat (the thermal expansibility is low). If the thermal expansibility is high, a veining defect readily occurs. "A veining defect" herein mentioned is a burr-like defect which occurs when a mold cracks due to thermal expansion during casting and a molten metal flows into the crack. When artificial sand is used as the refractory granular material, it is possible to manufacture a large-sized mold or a mold which can be used even when pouring a high-temperature molten metal. That is, a veining defect hardly occurs.

Note that natural sand is more inexpensive than artificial sand, so it is favorable to mix natural sand and artificial sand in order to reduce the manufacturing cost.

Silica sand is favorable as natural sand. This is so because, e.g., zircon sand is relatively expensive as natural sand, chromite sand cannot easily be discarded because it contains chromium, and olivine sand tends to increase the surface phase degree of a three-dimensional laminated and shaped mold. Silica sand can alleviate these problems.

A mold is used to cast a cast metal, and disassembled after casting in order to extract the cast metal. That is, the cast metal is a final object (final product), but the mold is finally destroyed. Accordingly, a readily discardable inexpensive material having a sufficiently low surface phase degree is preferable.

(Coating Sand)

In this embodiment, a coating sand manufacturing method includes the following two methods.

The first method obtains the material of a shaped object by coating the surface of a refractory granular material with an acid, and mixing magnesium sulfate. First, the refractory granular material is heated to about 120° C. in advance. Then, an acid solution prepared by dissolving an acid in a solvent (mainly, water) is added to the heated refractory granular material, and the solvent of the acid solution is volatilized by the heat of the heated refractory granular material and stirring. After the surface of the refractory granular material is coated with the acid by the series of steps described above, magnesium sulfate is mixed.

The second method mixes a refractory granular material and acid solution. Then, the method adds and mixes magnesium sulfate. When continuing stirring, magnesium sulfate and the solvent (water) of the acid solution cause a hydration reaction, so water molecules are immobilized, and coating sand is formed.

Coating sand can be formed by the above-described methods. However, the smaller the water content in coating sand, the more easily the hardening reaction of the binder progresses. Accordingly, coating sand is preferably formed by the first method.

As the acid, sulfuric acid, phosphoric acid, a sulfonic acid, or a carboxylic acid is used. Examples of the sulfonic acid are p-toluenesulfonic acid, xylene sulfonic acid, benzene sulfonic acid, and methane sulfonic acid. Examples of the carboxylic acid are lactic acid, citric acid, malic acid, tartaric acid, malonic acid, maleic acid, oxalic acid, and benzoic acid.

Of these acids, sulfuric acid has a high catalytic ability to harden the binder. Therefore, hardening after binder printing rapidly progresses, and this makes it difficult to manufacture a laminated and shaped mold. Accordingly, a solution mixture of sulfuric acid and another acid is prepared, and the refractory granular material is coated with the acid by the above-mentioned steps.

Also, phosphoric acid contains no sulfur component, and has catalytic ability next to that of sulfuric acid. Therefore, phosphoric acid is singly used, or a solution mixture of phosphoric acid and sulfuric acid, a sulfonic acid, or a carboxylic acid is prepared, and the refractory granular material is coated with the acid by the above-mentioned steps.

On the other hand, a carboxylic acid has a low catalytic ability to harden the binder, so a solution mixture of a carboxylic acid and another acid such as sulfuric acid or a sulfonic acid is prepared, and the refractory granular material is coated with the acid by the above-mentioned steps. Furthermore, a sulfonic acid has a sufficient catalytic ability to harden the binder. Accordingly, a sulfonic acid is singly used, or a solution mixture of a sulfonic acid and another acid such as sulfuric acid or a carboxylic acid is prepared, and the refractory granular material is coated with the acid by the above-mentioned steps.

(Mixing Materials)

In this embodiment, the following materials are further mixed in the acid-coated refractory granular material. In a high-humidity environment, this mixing material is desirably mixed as a moisture absorbent for improving a state in which coating sand grains aggregate and make recoating impossible. Examples of the material which functions as a moisture absorbent like this are a metal salt capable of a hydration reaction and a crystal such as zeolite. An example of the metal salt capable of a hydration reaction is a sulfate such as sodium sulfate or magnesium sulfate. Also, this mixing material is desirably mixed as a hardening accelerator for increasing the hardening reaction rate of the organic binder during laminating and shaping. A hardening accelerator like this is preferably a material which generates an acid functioning as a catalyst by metathesis of the material, thereby generating a strong catalytic effect. An example of the material which functions as the hardening accelerator is a sulfate such as ammonium sulfate or magnesium sulfate. Note that the abovementioned mixing materials can be used singly or in the form of a combination in order to effectively use their functions.

In this embodiment, magnesium sulfate is used as the mixing material for the acid-coated coating material. Magnesium sulfate has moisture absorbency by a hydration reaction, and generates a strong catalytic effect by generating sulfuric acid having catalysis by metathesis. In addition, magnesium sulfate causes a hydration reaction with condensed water (water) generated by the hardening reaction of the organic binder, thereby increasing the hardening reaction rate of the organic binder.

Magnesium sulfate includes a monohydrate to a dodecahydrate in addition to an anhydride. However, anhydrous magnesium sulfate capable of a hydration reaction is preferably used in order to effectively prevent deterioration of the recoatability of the coating sand caused by moisture absorption. That is, when the refractory granular material is coated with an acid, the surface free energy increases. This state stabilizes by adsorbing water or microparticles. When anhydrous magnesium sulfate is mixed, therefore, the material stabilizes by adsorption. Also, water in the air immobilize the water molecules by the hydration reaction of magnesium sulfate. Accordingly, the material can be used as stable coating sand.

A favorable use amount of magnesium sulfate is 0.05 to 1 pts.mass, when using an anhydride, with respect to 100 pts.mass of the granular material. If the amount is less than 0.05 pts.mass, the ability to immobilize water in the air as a hydrate deteriorates. If the amount exceeds 1 pts.mass, the hardening reaction rate of the binder becomes too high, and layer peeling occurs during laminated mold shaping.

(Organic Binder)

The organic binder is one of furfuryl alcohol, a mixture of furfuryl alcohol and at least one material selected from the group consisting of 2,5-bis(hydroxymethyl)furan, a phenol, and a bisphenol, a condensate or cocondensate of a phenol, a bisphenol, and an aldehyde, a mixture of furfuryl alcohol and a condensate or cocondensate of a phenol, a bisphenol, and an aldehyde, a mixture of furfuryl alcohol, 2,5-bis(hydroxymethyl)furan, and a condensate or cocondensate of a phenol, a bisphenol, and an aldehyde, a mixture of furfuryl alcohol and a condensate of urine and an aldehyde, and a mixture of furfuryl alcohol, 2,5-bis(hydroxymethyl)furan, and a condensate of urine and an aldehyde.

Examples of the phenol are phenol, cresol, resorcin, nonylphenol, and a cashew nut shell liquid. Examples of the bisphenol are bisphenol A, bisphenol F, bisphenol C, bisphenol S, and bisphenol Z. Examples of the aldehyde are formaldehyde, paraformaldehyde, acetaldehyde, furfural, glyoxal, gultardialdehyde, and dialdehyde phthalate.

In the condensate or cocondensate of a phenol, a bisphenol, and an aldehyde, it is possible to singly use one of a phenol and a bisphenol or mix a phenol and a bisphenol. It is particularly favorable to use a cocondensate of a phenol and a bisphenol because a strong three-dimensional laminated and shaped mold is readily obtained.

The use amount of an aldehyde in a phenol-based compound is preferably 1.0 to 3.5 time mole, more preferably, 1.1 to 2.5 time mole, and particularly preferably, 1.3 to 1.7 time mole with respect to the total number of moles of the phenol-based compound. When the use amount of an aldehyde is 1.0 time mole or more with respect to the total number of moles of the phenol-based compound, the strength of the three-dimensional laminated and shaped mold increases. On the other hand, when the use amount of an aldehyde is 3.5 time mole or less with respect to the total number of moles of the phenol-based compound, the amount of an unreacted aldehyde can be reduced. If an unreacted aldehyde remains, the amount of a harmful aldehyde increases during laminating and shaping.

In the reaction between urea and the aldehyde, the use amount of the aldehyde is preferably 1.0 to 3.0 time mole, more preferably, 1.3 to 2.5 time mole, and particularly preferably, 1.5 to 2.0 time mole, with respect to the number of moles of urea. Furthermore, a silane coupling agent can also be added to the binder in order to increase the strength of the three-dimensional laminated and shaped mold.

Examples of the silane coupling agent are N-β(aminoethyl)γ-aminopropylmethyldimethoxysilane, γ-aminopropyltriethoxysilane, γ-(2-aminoethyl)aminopropyltrimethoxysilane, and γ-glycidoxypropyltrimethoxysilane.

The addition amount of the silane coupling agent is preferably 0.01 to 3.0 pts.mass, and more preferably, 0.1 to 2.0 pts.mass with respect to 100 pts.mass of the binder. When the addition amount of the silane coupling agent is 0.01 pts.mass or more, a sufficient effect of increasing the strength of the three-dimensional laminated and shaped mold is obtained. The ease with which this effect of increasing the strength of the three-dimensional laminated and shaped mold is obtained increases as the addition amount of the silane coupling agent increases. However, the effect reaches its peak even when the addition amount keeps increasing. Accordingly, the addition amount of the silane coupling agent is preferably 3.0 pts.mass or less.

<<Granular Material Laminating Process and Organic Binder Printing Process>>

For example, the processes of laminating the acid-coated refractory granular material containing magnesium sulfate and printing the binder on the laminated refractory granular material are performed as follows.

First, a refractory granular material is laminated on the bottom surface of a metal case placed in a three-dimensional laminating and shaping apparatus (available from CMET) using a printing shaping method, by the blade mechanism including the recoater. Then, the printing nozzle head is scanned on the laminated refractory granular material by the printing nozzle head mechanism based on data obtained by 3DCAD design of the shape of a three-dimensional laminated and shaped mold, thereby printing the binder. The bottom surface of the metal case is a shaping table, and vertically movable by the shaping table mechanism. After the binder is printed, the bottom surface (shaping table) of the metal case is moved down by one layer, the refractory granular material is laminated in the same manner as above, and the binder is printed on the laminated refractory granular material. These operations are repeated. The thickness of one layer is preferably 100 to 500 µm, and more preferably, 200 to 300 µm.

The coating amount when printing the binder is not particularly limited. When the mass of one layer of the granular material is 100 pts.mass, however, the coating amount is preferably 0.4 to 10 pts.mass, and more preferably, 0.8 to 5 pts.mass.

When using the acid-coated refractory granular material containing magnesium sulfate according to this embodiment, metathesis of magnesium sulfate generates sulfuric acid, thereby generating a strong catalytic effect. At the same time, magnesium sulfate causes a hydration reaction with condensed water (water) generated during the hardening reaction of the organic binder, thereby increasing the hardening reaction rate of the organic binder.

(Strength Appearance Rate)

FIG. 1 is a view showing the mold strength appearance rate of the acid-coated granular material mixed with magnesium sulfate according to this embodiment. Note that FIG. 1 shows the test result of mixing performed by hand molding. The test method complies with JACT test method HM-1 ("Test Method for Mold and Mold Material", P53-54: The Small and Medium Enterprise Agency, May 1999).

As shown in FIG. 1, the strength increased to 3.4 MPa in 1 hr, 7.5 MPa in 2 hrs, 8.0 MPa in 3 hrs, and 10 MPa in 24 hrs. When compared to a case in which the strength of the existing two-component self-hardening mold is about 0 Mpa in 1 hr, 0.8 Mpa in 2 hrs, 3.0 MPa in 3 hrs, and 8.9 MPa in 24 hrs, the strength abruptly increased in 1 hr to 3 hrs (100 in FIG. 1). This result reveals that "metathesis of magnesium sulfate generates sulfuric acid, thereby generating a strong catalytic effect, and at the same time magnesium sulfate causes a hydration reaction with condensed water (water) generated during the hardening reaction of the organic binder, thereby increasing the hardening reaction rate of the organic binder" as described above, that is, the granular material of this embodiment increases the rate of laminating and shaping. In addition, the increase in hardening reaction rate of the organic binder increases the shape accuracy of the laminated and shaped object. That is, it is possible to prevent the hardening reaction from becoming slow, thereby preventing a fine shape from becoming dull and becoming a planar shape.

<<Functions and Effects of this Embodiment>>

In this embodiment, the refractory granular material is coated with an acid and contains magnesium sulfate as catalysts for hardening the binder. When compared to the conventional method by which the material is coated with only an acid, therefore, the fluidity is higher, and the refractory granular material in an unprinted portion is directly reusable.

When a three-dimensional laminated and shaped mold is manufactured by using natural sand such as silica sand as the refractory granular material, a veining defect easily occurs in the obtained mold. The reason for this is probably as follows.

Since natural sand has a phase transition point, the volume expands by the heat of casting. In particular, the inside (a portion in contact with a molten metal) of the mold easily expands because the heat of the molten metal is easily transferred, but the outside of the mold hardly expands because the heat of the molten metal is hardly transferred. This difference between the expansions of the inside and outside generates a crack inside the mold.

By contrast, artificial sand of this embodiment hardly causes phase transition, and hence hardly expands by the heat of casting. Accordingly, a mold manufactured by using artificial sand hardly causes a veining defect.

When manufacturing a mold by using the two-component self-hardening mold of the prior art, recoating is performed by mixing the liquid hardener in artificial sand. However, the fluidity decreases when the liquid hardener is blended in artificial sand, and the recoatability often decreases.

To improve the fluidity of artificial sand, the liquid hardener is sometimes mixed in a mixture of artificial sand and natural sand.

Unfortunately, a mold obtained by this method can resist the pouring temperature of a molten metal if the temperature is low (e.g., when pouring aluminum), but cannot resist the pouring temperature if the temperature is high (e.g., when pouring iron). This makes it difficult to manufacture a large-sized mold. This is so because the ease with which a veining defect occurs as the size of a mold increases. The reason for this is presumably as follows.

A molten metal poured into a mold cools down and solidifies from the outside (a portion in contact with the mold) rather than the central portion. When the mold is small, the molten metal cools down within a short time, so the molten metal on the outside cools down and solidifies before the mold cracks. Even when the mold cracks after that, therefore, it is perhaps possible to prevent the molten metal from flowing into the crack. On the other hand, when the mold is large, the molten metal takes a long time to cool down. Therefore, the mold probably cracks and causes a veining defect before the molten metal on the outside completely solidifies.

In this embodiment, however, the refractory granular material is coated with the liquid hardener instead of mixing the latter in the former, so it is possible to solve the problem of fluidity arising when using artificial sand as the refractory granular material. That is, in this embodiment, recoating can be performed even when singly using artificial sand. This makes it possible to manufacture a large-sized mold which can resist (that is, which hardly causes a veining defect) even when pouring a high-temperature molten metal.

In addition, the three-dimensional laminated and shaped mold manufacturing apparatus using the acid-coated refractory granular material containing magnesium sulfate according to this embodiment and an organic binder can manufacture a three-dimensional laminated and shaped mold at a speed higher than 50,000 cc, for example at a speed of 100,000 cc, and can also maintain the strength of the three-dimensional laminated and shaped mold.

For example, the upper limit of the manufacturing speed of the two-component self-hardening mold described in patent literature 1 is 50,000 cc. This is so because the liquid hardener added to the granular material decreases the fluidity, so the fluidity is maintained by reducing the liquid hardener, and the amount of binder is increased, and as a consequence the hardening time prolongs. Furthermore, when the fluidity of the granular material is low, it is necessary to add vibrations to the blade mechanism including the recoater.

The acid-coated granular material containing magnesium sulfate according to this embodiment is spherical and dry, and hence has a high recoatability and enables high-speed manufacture of a three-dimensional laminated and shaped mold.

EXAMPLES

Examples of the present invention will be explained in more detail below, but the present invention is not limited to these examples. Note that the binder used in these examples will be presented below. Note also that a method of measuring the thermal expansion coefficient of a test piece obtained by each example will be presented below.

(Organic Binder)

The binder was obtained by mixing 0.3 pts.mass of N-β(aminoethyl)γ-aminopropylmethyldimethoxysilane in 100 pts.mass of a solution mixture containing 90 pts.mass of furfuryl alcohol and 10 pts.mass of bisphenol A.

(Measurement of Thermal Expansion Coefficient)

The thermal expansion coefficient of a test piece was measured as follows based on JACT test method M-2 (a rapid thermal expansion coefficient measurement test method of thermal expansion test methods).

The test piece was inserted into a furnace heated to 1,000° C., the expansion was measured for 5 min by a thermal expansion meter, and the thermal expansion coefficient was calculated by:

Thermal expansion coefficient (%)={expansion (mm)/length (mm) of unheated test piece}×100

(Measurement of Water Content)

The water content of the coating sand was measured as a free water content in accordance with "JACT test method S-9 molding sand water content test method ("Test Method for Mold and Molding Material", The Small and Medium Enterprise Agency, May 1999)", as a test method of measuring the free water content of molding sand (the sulfate-containing granular material of this embodiment).

The coating sand was weighed, dried at 105° C. to 110° C. in a dryer, and cooled to room temperature in a desiccator, and the mass was measured. The free water content was calculated by the following equation from a mass reduction when a constant mass was obtained by repeating the above operation:

Free water content (%)=mass reduction (%)/sample (g)×100

(Fluidity Test)

The fluidity of the coating sand can be represented by the ratio (D/d) of the diameter (D) of a slump to the diameter (d) of a slump cone in a slump test. That is, the diameter (D) of a slump is obtained by a test called a slump test which measures the fluidity of coating sand. The diameter (D) of a slump is the spread of coating sand when molding sand is packed in a cup called a slump cone and the slump cone is pulled up from the bottom plate.

In the present invention, a slump cone having an opening diameter of 50 mm, a bottom surface diameter of 40 mm, and a height of 75 mm was used. In this case, the opening diameter: 50 mm is the slump cone diameter: d. The fluidity of coating sand can be evaluated by measuring a slump flow, i.e., the diameter (D) of the spread of the coating sand when the slump cone is vertically pulled up, and obtaining the ratio (D/d) of the diameter (D) of the slump to the diameter of the slump cone.

(Confirmation of Influence of Moisture Absorption on Recoatability)

The water content test and fluidity test were conducted immediately after coating sand was formed. After that, the coating sand was left to stand in a free state in an environment at a temperature of 20° C. and a humidity of 60% for 48 hrs, and the water content test, fluidity test, and recoatability confirmation were performed on the coating sand.

Example 1

As a refractory granular material, artificial sand (CERABEADS X #1450, ITOCHU CERATECH) obtained by a sintering method was heated to 120° C. On the other hand, a mixture of 65 pts.mass of p-toluenesulfonic acid which is a solid at room temperature (20° C.) and 10 pts.mass of lactic acid was dissolved in water, thereby preparing an aqueous 75-mass % solution. After 0.3 pts.mass of the aqueous solution were added to 100 pts.mass of the heated refractory granular material, the material was stirred for 5 min, thereby volatilizing water as the solvent. Then, 0.5 pts.mass of anhydrous magnesium sulfate were added, and the material was stirred for 1 min. Subsequently, the material was cooled to room temperature (25° C.) and passed through a sieve having a mesh size of 0.3 mm, thereby forming coating sand, and the water content and fluidity were measured. The obtained coating sand was left to stand in a free state in an environment at a temperature of 20° C. and a humidity of 65% for 7 days. After that, the water content and fluidity of the coating sand were measured. Table 1 shows the obtained results.

By using a three-dimensional laminating and shaping apparatus (CMET) using a printing shaping method, this refractory granular material was laminated on the bottom surface of a metal case placed in the three-dimensional laminating and shaping apparatus by a blade mechanism including a recoater for dry sand.

Then, a printing nozzle head was scanned on the laminated refractory granular material based on data obtained by 3DCAD design of the shape of a three-dimensional laminated and shaped mold, thereby printing a binder such that the discharge amount was 2.0 pts.mass with respect to 100 pts.mass of the laminated sand. After the binder was printed, the bottom surface (a shaping table) of the metal case was moved down by one layer (280 μm), the refractory granular material was laminated in the same manner as above, and the binder was printed on the laminated refractory granular material such that the discharge amount was 2.0 pts.mass with respect to 100 pts.mass of the laminated sand. By repeating this process including laminating and printing, a columnar laminated object having a diameter d of 30 mm and a length L of 50 mm was manufactured.

Note that three types of laminated objects were manufactured by repeating the process of laminating the granular material in the three directions of X-, Y-, and Z-axes, and printing the binder on the laminated granular material. In this process, whether lamination was feasible (the feasibility of lamination) in each direction was visually checked. Table 1 shows the obtained results.

After printing, the refractory granular material in a binder unprinted portion was removed by a brush, thereby obtaining columnar test pieces (three-dimensional laminated and shaped molds) having a diameter of 30 mm and a length of 50 mm. The thermal expansion coefficient of each obtained test piece was measured. Table 1 shows the thermal expansion coefficient measurement results. Also, the refractory granular material in the binder unprinted portion was not regenerated but reused as reusable sand.

Example 2

Artificial sand (AR SAND #1000, ITOH KIKOH, average grain size=106 μm) obtained by a fusion method was used as a refractory granular material.

As a refractory granular material, artificial sand (AR SAND #1000, ITOH KIKOH, average grain size=106 μm) obtained by a fusion method was heated to 120° C. On the other hand, a mixture of 65 pts.mass of p-toluenesulfonic acid which is a solid at room temperature (20° C.) and 10 pts.mass of lactic acid was dissolved in water, thereby preparing an aqueous 75-mass % solution. After 0.2 pts.mass of the aqueous solution were added to 100 pts.mass of the heated refractory granular material, the material was stirred for 5 min, thereby volatilizing water as the solvent. Then, 0.5 pts.mass of anhydrous magnesium sulfate were added, and the material was stirred for 1 min. Subsequently, the material was cooled to room temperature (25° C.) and passed through a sieve having a mesh size of 0.3 mm. Test pieces were manufactured and evaluated following the same procedures as in Example 1 except the foregoing. Table 1 shows the obtained results.

Example 3

Test pieces were manufactured and evaluated following the same procedures as in Example 2 except that artificial sand (LUNAMOS MS #110, Kao-Quaker, average grains size=106 μm) obtained by a flame fusion method was used as a refractory granular material. Table 1 shows the obtained results.

Also, the refractory granular material in a binder unprinted portion was not regenerated but reused as reusable sand.

Example 4

Test pieces were manufactured and evaluated following the same procedures as in Example 1 except that silica sand (FS001-EU, Distributor: EXONE, average grains size=106 μm) was used as a refractory granular material. Table 1 shows the obtained results.

Also, the refractory granular material in a binder unprinted portion was not regenerated but reused as reusable sand.

TABLE 1

| | | | Example 1 | Example 2 | Example 3 | Example 4 |
|---|---|---|---|---|---|---|
| Refractory granular material | | | Sintered artificial sand | Fused artificial sand | Flame-fused artificial sand | Silica sand |
| Coating sand (immediately after manufacture) | Water content (%) | | 0.10 | 0.08 | 0.09 | 0.10 |
| | Fluidity (D/d) | | 3.4 | 3.8 | 3.7 | 3.0 |
| Coating sand (left to stand for 7 days) | Water content (%) | | 0.20 | 0.17 | 0.18 | 0.21 |
| | Fluidity (D/d) | | 3.4 | 3.8 | 3.7 | 3.0 |
| Evaluation | Feasibility of laminating and shaping | X-axis direction | Feasible | Feasible | Feasible | Feasible |
| | | Y-axis direction | Feasible | Feasible | Feasible | Feasible |
| | | Z-axis direction | Feasible | Feasible | Feasible | Feasible |
| | Linear thermal expansion coefficient (%) | X-axis direction | 0.10 | 0.20 | 0.10 | 1.49 |
| | | Y-axis direction | 0.10 | 0.20 | 0.10 | 1.49 |
| | | Z-axis direction | 0.11 | 0.22 | 0.11 | 1.51 |
| Necessity of regeneration of sand in unprinted portion | | | Unnecessary | Unnecessary | Unnecessary | Unnecessary |

Example 5

A mixture of 65 pts.mass of p-toluenesulfonic acid which is a solid at room temperature (20° C.) and 10 pts.mass of lactic acid was dissolved in water, thereby preparing an aqueous 75-mass % solution. After 0.3 pts.mass of the aqueous solution were added to 100 pts.mass of artificial sand (CERABEADS X #1450, ITOCHU CERATECH) obtained by a sintering method as a refractory granular material, the material was stirred for 1 min. Then, 0.5 pts.mass of anhydrous magnesium sulfate were added, and the material was stirred for 5 min in order to immobilize water molecules in the kneaded sand by a hydration reaction by magnesium sulfate, and dry the kneaded sand. After that, the material was passed through a sieve having a mesh size of 0.3 mm, thereby forming coating sand, and the water content and fluidity were measured. The obtained coating sand was left to stand in a free state in an environment at a temperature of 20° C. and a humidity of 65% for 7 days. After that, the water content and fluidity of the coating sand were measured. Table 2 shows the obtained results.

By using a three-dimensional laminating and shaping apparatus (CMET) using a printing shaping method, this refractory granular material was laminated on the bottom surface of a metal case placed in the three-dimensional laminating and shaping apparatus by a blade mechanism including a recoater for dry sand.

Then, a printing nozzle head was scanned on the laminated refractory granular material based on data obtained by 3DCAD design of the shape of a three-dimensional laminated and shaped mold, thereby printing a binder such that the discharge amount was 2.0 pts.mass with respect to 100 pts.mass of the laminated sand. After the binder was printed, the bottom surface (a shaping table) of the metal case was moved down by one layer (280 μm), the refractory granular material was laminated in the same manner as above, and the binder was printed on the laminated refractory granular material such that the discharge amount was 2.0 pts.mass with respect to 100 pts.mass of the laminated sand. By repeating this process including laminating and printing, a columnar laminated object having a diameter d of 30 mm and a length L of 50 mm was manufactured.

Note that three types of laminated objects were manufactured by repeating the process of laminating the granular material in the three directions of X-, Y-, and Z-axes, and printing the binder on the laminated granular material. In this process, whether lamination was feasible (the feasibility of lamination) in each direction was visually checked. Table 2 shows the obtained results.

After printing, the refractory granular material in a binder unprinted portion was removed by a brush, thereby obtaining columnar test pieces (three-dimensional laminated and shaped molds) having a diameter of 30 mm and a length of 50 mm. The thermal expansion coefficient of each obtained test piece was measured. Table 2 shows the thermal expansion coefficient measurement results. Also, the refractory granular material in the binder unprinted portion was not regenerated but reused as reusable sand.

Example 6

After 0.2 pts.mass of an aqueous 75-mass % solution prepared by dissolving a mixture of 65 pts.mass of p-toluenesulfonic acid which is a solid at room temperature (20° C.) and 10 pts.mass of lactic acid in water were added to 100 pts.mass of artificial sand (AR SAND #1000, ITOH KIKOH, average grain size=106 μm) obtained by a fusion method as a refractory granular material, the material was stirred for 1 min. After that, 0.5 pts.mass of anhydrous magnesium sulfate were added, and the material was stirred for 5 min in order to immobilize water molecules in the kneaded sand by a hydration reaction by magnesium sulfate, and dry the kneaded sand. After that, the material was passed through a sieve having a mesh size of 0.3 mm. Test pieces were manufactured and evaluated following the same procedures as in Example 5 except the foregoing. Table 2 shows the obtained result's.

Example 7

Test pieces were manufactured and evaluated following the same procedures as in Example 5 except that artificial sand (LUNAMOS MS #110, Kao-Quaker, average grains size=106 μm) obtained by a flame fusion method was used as a refractory granular material. Table 2 shows the obtained results.

Example 8

Test pieces were manufactured and evaluated following the same procedures as in Example 5 except that silica sand (FS001-EU, Distributor: EXONS, average grains size=106 μm) was used as a refractory granular material. Table 2 shows the obtained results.

TABLE 2

| | | | Example 5 | Example 6 | Example 7 | Example 8 |
|---|---|---|---|---|---|---|
| Refractory granular material | | | Sintered artificial sand | Fused artificial sand | Flame-fused artificial sand | Silica sand |
| Coating sand (immediately after manufacture) | Water content (%) | | 0.20 | 0.18 | 0.19 | 0.20 |
| | Fluidity (D/d) | | 3.4 | 3.8 | 3.7 | 3.0 |
| Coating sand (left to stand for 7 days) | Water content (%) | | 0.30 | 0.27 | 0.28 | 0.31 |
| | Fluidity (D/d) | | 3.2 | 3.6 | 3.5 | 3.0 |
| Evaluation | Feasibility of laminating and shaping | X-axis direction | Feasible | Feasible | Feasible | Feasible |
| | | Y-axis direction | Feasible | Feasible | Feasible | Feasible |
| | | Z-axis direction | Feasible | Feasible | Feasible | Feasible |
| | Linear thermal expansion coefficient (%) | X-axis direction | 0.10 | 0.20 | 0.10 | 1.49 |
| | | Y-axis direction | 0.10 | 0.20 | 0.10 | 1.49 |
| | | Z-axis direction | 0.11 | 0.22 | 0.11 | 1.51 |
| Necessity of regeneration of sand in unprinted portion | | | Unnecessary | Unnecessary | Unnecessary | Unnecessary |

Comparative Example 1

As a refractory granular material, artificial sand (CERABEADS X #1450, ITOCHU CERATECH) obtained by a sintering method was heated to 120° C. On the other hand, a mixture of 65 pts.mass of p-toluenesulfonic acid which is a solid at room temperature (20° C.) and 10 pts.mass of lactic acid was dissolved in water, thereby preparing an aqueous 75-mass % solution. After 0.3 pts.mass of the aqueous solution were added to 100 pts.mass of the heated refractory granular material, the material was stirred for 5 min, thereby volatilizing water as the solvent. Then, the material was cooled to room temperature (25° C.) and passed through a sieve having a mesh size of 0.3 mm, thereby forming coating sand, and the water content and fluidity were measured. The obtained coating sand was left to stand in a free state in an environment at a temperature of 20° C. and a humidity of 65% for 7 days. After that, the water content and fluidity of the coating sand were measured. Table 3 shows the obtained results.

By using a three-dimensional laminating and shaping apparatus (CMET) using a printing shaping method, an attempt was made to laminate this refractory granular material on the bottom surface of a metal case placed in the three-dimensional laminating and shaping apparatus by a blade mechanism including a recoater for dry sand. However, this lamination was impossible because the fluidity was low. Table 3 shows the obtained results.

Comparative Example 2

Artificial sand (AR SAND #1000, ITOH KIKOH, average grain size=106 μm) obtained by a fusion method was used as a refractory granular material. The artificial sand obtained by a fusion method was heated to 120° C. Then, a mixture of 65 pts.mass of p-toluenesulfonic acid which is a solid at room temperature (20° C.) and 10 pts.mass of lactic acid was dissolved in water, thereby preparing an aqueous 75-mass % solution. After 0.1 pts.mass of the aqueous solution was added to 100 pts.mass of the heated refractory granular material, the material was stirred for 5 min, thereby volatilizing water as the solvent. Subsequently, the material was cooled to room temperature (25° C.) and passed through a sieve having a mesh size of 0.3 mm. Evaluation was performed following the same procedures as in Comparative Example 1 except the foregoing. Table 3 shows the obtained results.

By using a three-dimensional laminating and shaping apparatus (CMET) using a printing shaping method, an attempt was made to laminate this refractory granular material on the bottom surface of a metal case placed in the three-dimensional laminating and shaping apparatus by a blade mechanism including a recoater for dry sand. However, this lamination was impossible because the fluidity was low. Table 3 shows the obtained results.

Comparative Example 3

Evaluation was performed following the same procedures as in Comparative Example 2 except that artificial sand (LUNAMOS MS #110, Kao-Quaker, average grains size=106 μm) obtained by a flame fusion method was used as a refractory granular material. Table 3 shows the obtained results.

By using a three-dimensional laminating and shaping apparatus (CMET) using a printing shaping method, an attempt was made to laminate this refractory granular material on the bottom surface of a metal case placed in the three-dimensional laminating and shaping apparatus by a blade mechanism including a recoater for dry sand. However, this lamination was impossible because the fluidity was low. Table 3 shows the obtained results.

Comparative Example 4

Evaluation was performed following the same procedures as in Comparative Example 1 except that silica sand (FS001-EU, Distributor: EXONE, average grains size=106 μm) was used as a refractory granular material. Table 3 shows the obtained results.

By using a three-dimensional laminating and shaping apparatus (CMET) using a printing shaping method, an attempt was made to laminate this refractory granular material on the bottom surface of a metal case placed in the three-dimensional laminating and shaping apparatus by a blade mechanism including a recoater for dry sand. However, this lamination was impossible because the fluidity was low. Table 3 shows the obtained results.

TABLE 3

| | | | Comparative Example 1 | Comparative Example 2 | Comparative Example 3 | Comparative Example 4 |
|---|---|---|---|---|---|---|
| Refractory granular material | | | Sintered artificial sand | Fused artificial sand | Flame-fused artificial sand | Silica sand |
| Coating sand (immediately after manufacture) | | Water content (%) | 0.10 | 0.08 | 0.09 | 0.10 |
| | | Fluidity (D/d) | 3.2 | 2.9 | 2.8 | 3.0 |
| Coating sand (left to stand for 7 days) | | Water content (%) | 0.20 | 0.17 | 0.18 | 021 |
| | | Fluidity (D/d) | 2.6 | 1.4 | 1.2 | 2.5 |
| Evaluation | Feasibility of laminating and shaping | X-axis direction | Unfeasible | Unfeasible | Unfeasible | Unfeasible |
| | | Y-axis direction | Unfeasible | Unfeasible | Unfeasible | Unfeasible |
| | | Z-axis direction | Unfeasible | Unfeasible | Unfeasible | Unfeasible |

TABLE 3-continued

| | | Comparative Example 1 | Comparative Example 2 | Comparative Example 3 | Comparative Example 4 |
|---|---|---|---|---|---|
| Linear thermal expansion coefficient (%) | X-axis direction | — | — | — | — |
| | Y-axis direction | — | — | — | — |
| | Z-axis direction | — | — | — | — |
| Necessity of regeneration of sand in unprinted portion | | — | — | — | — |

<<Evaluation of Examples and Comparative Examples>>

The refractory granular material used in each example had a high fluidity and could be well recoated in the direction of any of the X-, Y-, and Z-axes, and the dried state was maintained because magnesium sulfate compensated for an increase in water content by moisture adsorption by immobilizing the water molecules as crystallization water. Also, the refractory granular material in an unprinted portion was reusable without any regeneration process. In particular, the thermal expansion coefficients were small in Examples 1 to 3 and 5 to 7 using artificial sand as the refractory granular material. A small thermal expansion coefficient means that a veining defect hardly occurs even when a high-temperature molten metal is poured.

By contrast, it was impossible to laminate the refractory granular material of any of the comparative examples because the material adsorbed moisture and decreased the fluidity.

The invention claimed is:

1. A granular material for use in three-dimensional laminated mold shaping, comprising:
   (a) a mixed or coated material comprising a refractory granular raw material mixed with or coated with a first acid that, when printed with an organic binder, serves as a catalyst to activate and harden the organic binder to bind the granular material; and
   (b) a hardening accelerator,
   wherein the hardening accelerator is a second material that, when the mixed or coated material is printed with the organic binder, (i) undergoes a metathesis reaction to generate a second acid that catalyzes a hardening reaction of the organic binder; (ii) causes a hydration reaction with water generated during the hardening reaction to increase a rate of the hardening reaction, and (iii) absorbs moisture;
   wherein the first acid contains at least one of sulfuric acid, phosphoric acid, and a sulfonic acid, and wherein the sulfonic acid contains at least one of p-toluenesulfonic acid, xylene sulfonic acid, benzene sulfonic acid, and methane sulfonic acid.

2. The granular material according to claim 1, wherein the second material includes magnesium sulfate.

3. The granular material according to claim 2, wherein a grain size of the magnesium sulfate is equal to or less than 300 μm.

4. The granular material according to claim 2, wherein an amount of the magnesium sulfate is 0.05 to 1 pts. mass with respect to 100 pts. mass of the granular material.

5. The granular material according to claim 2, wherein the magnesium sulfate comprises anhydrous magnesium sulfate.

6. The granular material according to claim 2, wherein the magnesium sulfate is mixed in the mixing material or the coating material.

7. The granular material according to claim 1, wherein the refractory granular raw material is coated with the acid by adding a solution of the acid prepared by dissolving the first acid in a solvent to the refractory granular raw material after the refractory granular raw material is heated, and volatilizing the solvent by heat of the heated refractory granular raw material and stirring with a solution of the first acid.

8. The granular material according to claim 1, wherein the refractory granular raw material has an average grain size of 50 to 300 μm.

9. The granular material according to claim 8, wherein the refractory granular raw material contains at least one of natural sand including silica sand and artificial sand.

10. The granular material according to claim 9, wherein the artificial sand is obtained by one of a sintering method, a fusion method, and a flame fusion method.

11. A method for manufacturing the granular material according to claim 1, comprising:
    forming a coating material by coating a surface of the refractory granular raw material having an average grain size of 50 to 300 μm, with the first acid; and
    forming the granular material for use in laminated mold shaping by mixing magnesium sulfate in the coating material.

12. The method according to claim 11, wherein in the step of forming the coating material, the coating material is formed by preheating the granular raw material to about 120° C., adding an acid solution prepared by dissolving the acid in a solvent to the heated granular raw material, and volatilizing the solvent of the acid solution by heat of the heated granular raw material and stirring of the acid solution.

13. A method for manufacturing the granular material according to claim 1, comprising:
    forming a first material mixture by mixing the refractory granular raw material having an average grain size of 50 to 300 μm and an acid solution prepared by dissolving, in a solvent, the first acid;
    forming a second material mixture by adding and mixing magnesium sulfate in the first material mixture; and
    stirring the second material mixture, and immobilizing water molecules by a hydration reaction between the magnesium sulfate and the solvent of the acid solution, thereby forming the granular material for use in laminated mold shaping.

14. A method of manufacturing a three-dimensional laminated and shaped mold comprising:
    spreading the granular material according to claim 1 into layers;
    selectively ejecting an organic binder to the spread granular material and hardening the organic binder so as to bind the spread granular material in accordance with a target three-dimensional laminated and shaped mold; and repeating said spreading step and said hardening step until the target three-dimensional laminated and shaped mold is shaped.

15. The method according to claim 14, wherein, in said hardening step, a coating amount of the organic binder is controlled so as to be 0.4 to 10 pts. mass with respect to 100 pts. mass of the granular material of one layer.

\* \* \* \* \*